(12) United States Patent
Niu

(10) Patent No.: US 10,732,452 B2
(45) Date of Patent: Aug. 4, 2020

(54) DISPLAY DEVICE

(71) Applicant: Au Optronics Corporation, Hsinchu (TW)

(72) Inventor: Tzu-Ling Niu, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/172,839

(22) Filed: Oct. 28, 2018

(65) Prior Publication Data

US 2019/0219869 A1 Jul. 18, 2019

(30) Foreign Application Priority Data

Jan. 15, 2018 (TW) .............................. 107101388 A

(51) Int. Cl.
*G02F 1/1335* (2006.01)
*G02F 1/13* (2006.01)
(Continued)

(52) U.S. Cl.
CPC ........ *G02F 1/133524* (2013.01); *B60K 35/00* (2013.01); *G02B 6/005* (2013.01);
(Continued)

(58) Field of Classification Search
CPC ......... G02F 1/133524; G02F 1/133603; G02F 1/1336; G02F 1/1323; G02F 1/133608;
(Continued)

(56) References Cited

U.S. PATENT DOCUMENTS 8,967,847 B2 3/2015 Huang
9,891,373 B2 2/2018 Zhou
(Continued)

FOREIGN PATENT DOCUMENTS

CN 101251674 8/2008
CN 202533599 11/2012
(Continued)

OTHER PUBLICATIONS

"Search Report of Europe Counterpart Application", dated Jun. 5, 2019, pp. 1-7.
(Continued)

*Primary Examiner* — Jessica M Merlin
(74) *Attorney, Agent, or Firm* — JCIPRNET

(57) ABSTRACT

A display device includes a first light source, a second light source, a liquid crystal panel, and a light-guide device. The liquid crystal panel is disposed on the first light source and the second light source. The light-guide device is disposed between the first light source and the liquid crystal panel. A first light-receiving surface of the light-guide device faces toward the first light source. A second light-receiving surface of the light-guide device faces toward the second light source. A first light beam emitted by the first light source enters the light-guide device through the first light-receiving surface and leaves the light-guide device through a light-emitting surface opposite to the first light-receiving surface. A second light beam emitted by the second light source enters the light-guide device through the second light-receiving surface and leaves the light-guide device through the light-emitting surface.

16 Claims, 10 Drawing Sheets

(51) Int. Cl.
*F21V 8/00* (2006.01)
*G02F 1/13357* (2006.01)
*B60K 35/00* (2006.01)

(52) U.S. Cl.
CPC ......... *G02B 6/0023* (2013.01); *G02B 6/0045* (2013.01); *G02B 6/0068* (2013.01); *G02B 6/0075* (2013.01); *G02B 6/0091* (2013.01); *G02F 1/1323* (2013.01); *G02F 1/1336* (2013.01); *G02F 1/133603* (2013.01); *G02B 6/0035* (2013.01); *G02F 1/133608* (2013.01); *G09G 2320/028* (2013.01)

(58) Field of Classification Search
CPC ... G02F 1/133606; G02F 2001/133607; G02B 6/0045; G02B 6/005; G02B 6/0075; G02B 6/0023; G02B 6/0068; G02B 6/0091; G02B 6/0035; G02B 6/0013; G02B 6/0018; G02B 6/002; B60K 35/00; G09G 2320/028
See application file for complete search history.

(56) References Cited

U.S. PATENT DOCUMENTS

| | | | |
|---|---|---|---|
| 9,977,172 | B2 | 5/2018 | Gong et al. |
| 2008/0198295 | A1 | 8/2008 | Yuuki et al. |
| 2012/0235891 | A1 | 9/2012 | Nishitani et al. |
| 2013/0279190 | A1 | 10/2013 | Huang |
| 2016/0327726 | A1 | 11/2016 | Gong et al. |
| 2017/0045677 | A1 | 2/2017 | Zhou |
| 2017/0123129 | A1 | 5/2017 | Zheng |
| 2018/0088272 | A1 | 3/2018 | Chen et al. |
| 2018/0267344 | A1* | 9/2018 | Wu ............... G02F 1/1323 |
| 2019/0049651 | A1* | 2/2019 | Yamamoto ........... G02B 6/0025 |

FOREIGN PATENT DOCUMENTS

| | | |
|---|---|---|
| CN | 103376497 | 10/2013 |
| CN | 203744036 | 7/2014 |
| CN | 104832885 | 8/2015 |
| CN | 104848083 | 8/2015 |
| CN | 105137525 | 12/2015 |
| CN | 105700234 | 6/2016 |
| CN | 104536080 | 3/2017 |
| TW | M400593 | 3/2011 |
| WO | 2012144451 | 10/2012 |

OTHER PUBLICATIONS

"Office Action of China Counterpart Application", dated Jul. 17, 2019, pp. 1-7.

* cited by examiner

DISPLAY DEVICE

CROSS-REFERENCE TO RELATED APPLICATION

This application claims the priority benefit of Taiwan application serial no. 107101388, filed on Jan. 15, 2018. The entirety of the above-mentioned patent application is hereby incorporated by reference herein and made a part of this specification.

BACKGROUND OF THE INVENTION

1. Field of the Invention

The invention relates to a display device, and particularly relates to a display device having a first light source and a second light source.

2. Description of Related Art

Through the development of science and technology, various vehicles are equipped with a display device. Such display device not only displays traffic information (e.g., satellite navigation) to the driver, but may also be configured to display entertaining contents (e.g., gaming or movies) to the passenger next to the driver.

However, when the driver drives the vehicle, if the display device displays entertaining contents, the driver may be distracted by the contents, and an accident is more likely to occur. Therefore, a method for controlling a viewing angle of a display device is needed. With the method, when the display device displays entertaining contents, the driver is unable to view the frame of the display device, so the driver is not distracted and the chance of occurrence of an accident is reduced.

SUMMARY OF THE INVENTION

One or some exemplary embodiments of the invention provide a display device capable of controlling a viewing angle.

At least one display device according to an embodiment of the invention includes a first light source, a second light source, a liquid crystal panel, and a light-guide device. The liquid crystal panel is disposed on the first light source and the second light source. The light-guide device is disposed between the first light source and the liquid crystal panel. A first light-receiving surface of the light-guide device faces toward the first light source. A second light-receiving surface of the light-guide device faces toward the second light source. A first light beam emitted by the first light source enters the light-guide device through the first light-receiving surface and leaves the light-guide device through a light-emitting surface opposite to the first light-receiving surface. A second light beam emitted by the second light source enters the light-guide device through the second light-receiving surface and leaves the light-guide device through the light-emitting surface.

According to one or some exemplary embodiments of the invention, the viewing angle of the display device is controlled by using the first light source and the second light source.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
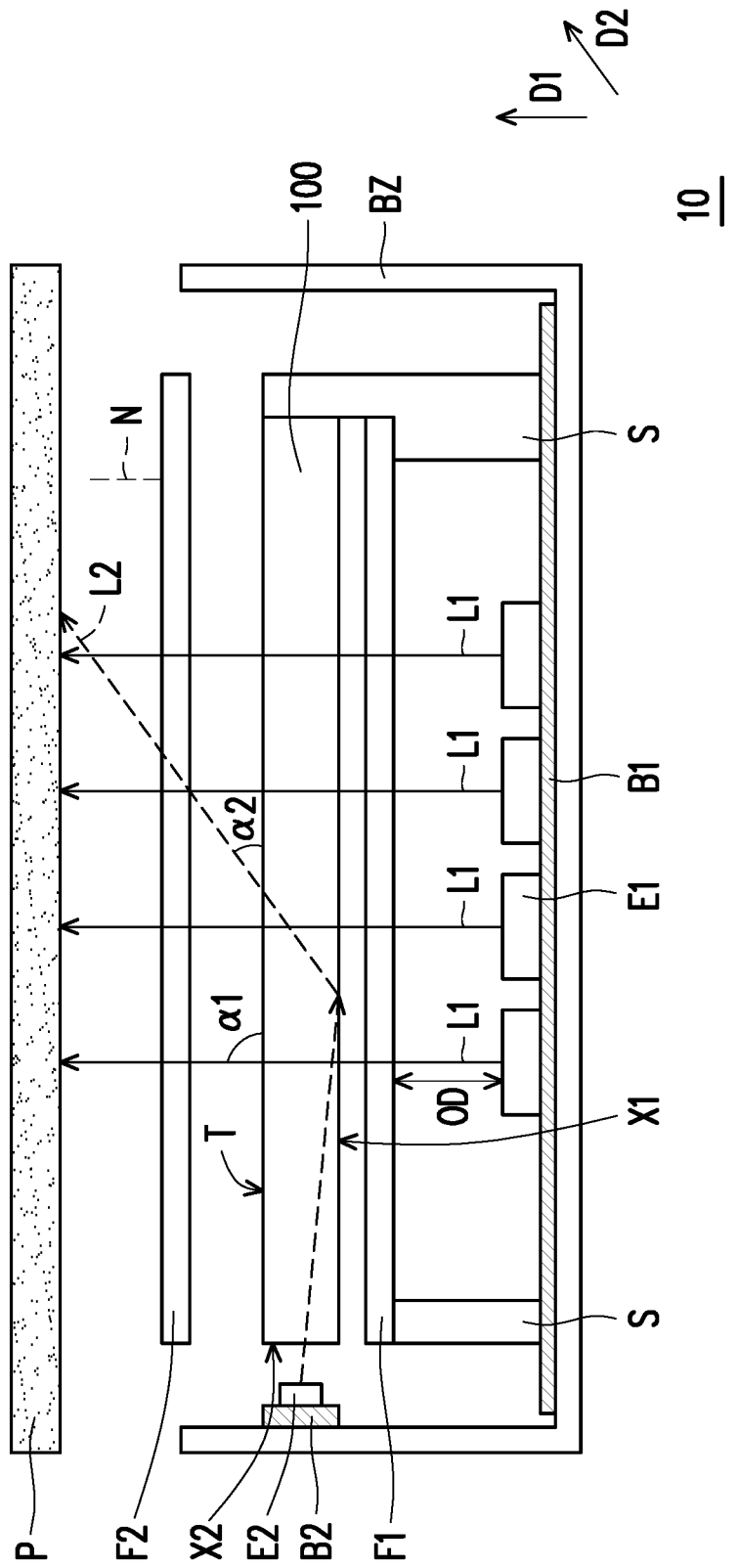
FIG. 1 is a schematic cross-sectional view illustrating a display device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The invention now will be described more fully hereinafter with reference to the accompanying drawings, in which exemplary embodiments of the invention are shown. As appreciated by those of ordinary skill in the art, various different modifications may be made to the embodiments described hereinafter without departing from the spirit or scope of the invention.

The terms used herein such as "about", "approximate", or "substantial" include a related value and an average within an acceptable deviation range of specific values determined by those with ordinary skills in the art with consideration of discussed measurement and a specific number of errors related to the measurement (i.e., a limitation of a measurement system). For example, the term "about", "approximate", or "substantial" may represent those within one or a plurality of standard deviations of the related value, such as within ±30%, ±20%, ±10%, ±5%.

Unless otherwise defined, all of the terms (including technical and scientific terms) used herein have the same meaning as commonly understood by those of ordinary skills in the art to which the invention belongs. It will be further understood that the terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the disclosure are described with reference of schematic cross-sectional and top views of the idealized embodiments. Therefore, a shape variation serving as a result of a manufacturing technique and/or manufacturing tolerance is omitted from the drawings. Therefore, the embodiments of the invention should not be interpreted as being limited to specific shapes shown in the drawings but may include a shape deviation caused during manufacture, for example. For example, a flat area shown in the figures or described herein may practically have rough and/or non-linear characteristics. Moreover, an acute angle shown in the drawings can practically be a rounded angle. Therefore, the shapes shown in the figures are substantially schematic, and the shapes therein are not intended to represent accurate shapes, and are not intended to serve as limitations of the claims.

FIG. 1 is a schematic cross-sectional view illustrating a display device according to an embodiment of the invention.

Referring to FIG. 1, a display device 10 includes a first light source E1, a second light source E2, a liquid crystal panel P, and a light-guide device 100.

The first light source E1 and the second light source E2 may be a light emitting diode, a bulb, a light tube, or other light emitting devices, for example. In the embodiment, the first light source E1 is disposed on a circuit board B1, and the second light source E2 is disposed on a circuit board B2. In the embodiment, the circuit board B1 is disposed at a bottom of a case BZ, for example, and the circuit board B2 is disposed on a sidewall of the case BZ, for example. Even though the circuit board B2 and the circuit board B1 of the embodiment are two separate circuit boards, the invention is not limited thereto. In some embodiments, the circuit board B2 and the circuit board B1 are connected with each other, and the connected circuit boards are bended at a corner of the case BZ, for example.

The liquid crystal panel P is disposed on the first light source E1 and the second light source E2, for example. The liquid crystal panel P includes a polarizer, a pixel array substrate, liquid crystal, and a color filter, for example. However, the invention is not limited thereto. In some embodiment, another liquid crystal panel may be further disposed on the liquid crystal panel P, and the another liquid crystal panel may omit a color filter, for example. However, the invention is not limited thereto.

The light-guide device 100 is located between the first light source E1 and the liquid crystal panel P. The light-guide device 100 includes a light-guide plate, for example. In addition, a material of the light-guide plate includes, for example, polymethyl methacrylate (PMMA), polycarbonate (PC), glass, polydimethylsiloxane (PDMS), polyethylene terephthalate (PET) or other materials capable of guiding light.

A first light-receiving surface X1 of the light-guide device 100 faces toward the first light source E1. A second light-receiving surface X2 of the light-guide device 100 faces toward the second light source E2. In the embodiment, the second light-receiving surface X2 is connected with the first light-receiving surface X1 and a light-emitting surface T. However, the invention is not limited thereto.

A first light beam L1 emitted by the first light source E1 enters the light-guide device 100 through the first light-receiving surface X1, and leaves the light-guide device 100 through the light-emitting surface T opposite to the first light-receiving surface X1 to arrive at the liquid crystal panel P. Even though FIG. 1 illustrates that each first light source E1 emits one first light beam L1, each first light source E1 of the embodiments of the invention emits more than just one first light beam L1. In practice, each first light source E1 of the embodiments of the invention may emit an infinite number of first light beams L1 from different angles.

A second light beam L2 emitted by the second light source E2 enters the light-guide device 100 through the second light-receiving surface X2, and leaves the light-guide device 100 through the light-emitting surface T after being reflected by the first light-receiving surface X1 to arrive at the liquid crystal panel P. Even though FIG. 1 illustrates one second light beam L2, the second light source E2 of the embodiments of the invention emits more than just one second light beam L2. In practice, each second light source E2 of the embodiments of the invention may emit an infinite number of second light beams L2 from different angles.

An included angle between a first average light-emitting direction D1 of the first light beam L1 leaving the light-emitting surface T and the light-emitting surface T is a first included angle $\alpha 1$. An included angle between a second average light-emitting direction D2 of the second light beam L2 leaving the light-emitting surface T and the light-emitting surface T is a second included angle $\alpha 2$. In the embodiment, the included angle $\alpha 1$ between the first average light-emitting direction D1 and the light-emitting surface T is greater than the included angle $\alpha 2$ between the second average light-emitting direction D2 and the light-emitting surface T.

Since the first average light-emitting direction D1 is different from the second average light-emitting direction D2, a switchable viewing angle of the display device 10 may be adjusted by choosing to turn on the first light source E1 or the second light source E2. For example, when the first light source E1 is turned on and the second light source E2 is turned off, the viewing angle of the display device 10 is a front viewing angle (about 0 degrees). If the second light source E2 is turned on and the first light source E1 is turned off, the viewing angle of the display device 10 may be deviated from the front and toward the side view angle. In other words, by turning on/off of the first light source E1 and the second light source E2, the viewing angle of the display device 10 for a user is controlled.

In some embodiments, the first light source E1 and the second light source E2 may be turned on at the same time to increase the brightness of a frame displayed by the display device 10.

In the embodiment, the display device 10 may optionally further include a first optical film F1. The first optical film F1 is disposed between the light-guide device 100 and the first light source E1. An optical distance OD is kept in advance between the first light source E1 and the first optical film F1. The optical distance OD offers a sufficient space for light emitted by the adjacent first light sources E1 to be mixed with each other.

The first optical film F1 may be a diffuser film, for example. However, the invention does not intend to limit that the first optical film F1 includes only one film. In some embodiments, the first optical film F1 further includes a diffuser plate, a quantum dot enhancement film (QDEF), a phosphor film, a prism film, a dual brightness enhancement film (DBEF), a grating film, other optical films or a combination thereof.

In the embodiment, the display device 10 may optionally further include a second optical film F2. The second optical film F2 is disposed between the light-guide device 100 and the liquid crystal panel P.

The second optical film F2 may be, for example, a diffuser film, a quantum dot enhancement film (QDEF), a phosphor film, a light-guide film, a prism film, a dual brightness enhancement film (DBEF), a grating film, other optical films, or a combination thereof. In some embodiments, the second optical film F2 is meshed.

In some embodiments, the second optical film F2 is disposed to refract the first light beam L1 and/or the second light beam L2. In some embodiment, when a light-emitting angle of the second light beam L2 is excessively large, the second optical film F2 may direct a traveling direction of the second light beam L2 to be closer to a normal line N of the light-emitting surface T.

In the embodiment, the display device 10 may optionally further include a frame S. The frame S is disposed on the case BZ or the circuit board B1, and is adapted to support the first optical film F1 and/or the light-guide device 100. However, the invention is not limited thereto. In some embodiments, the first optical film F1, the light-guide device 100, and the second optical film F2 may be fixed by another support structure or frame. The invention does not intend to limit how the first optical film F1, the light-guide device 100, and the second optical film F2 are fixed.

Figure 2A:
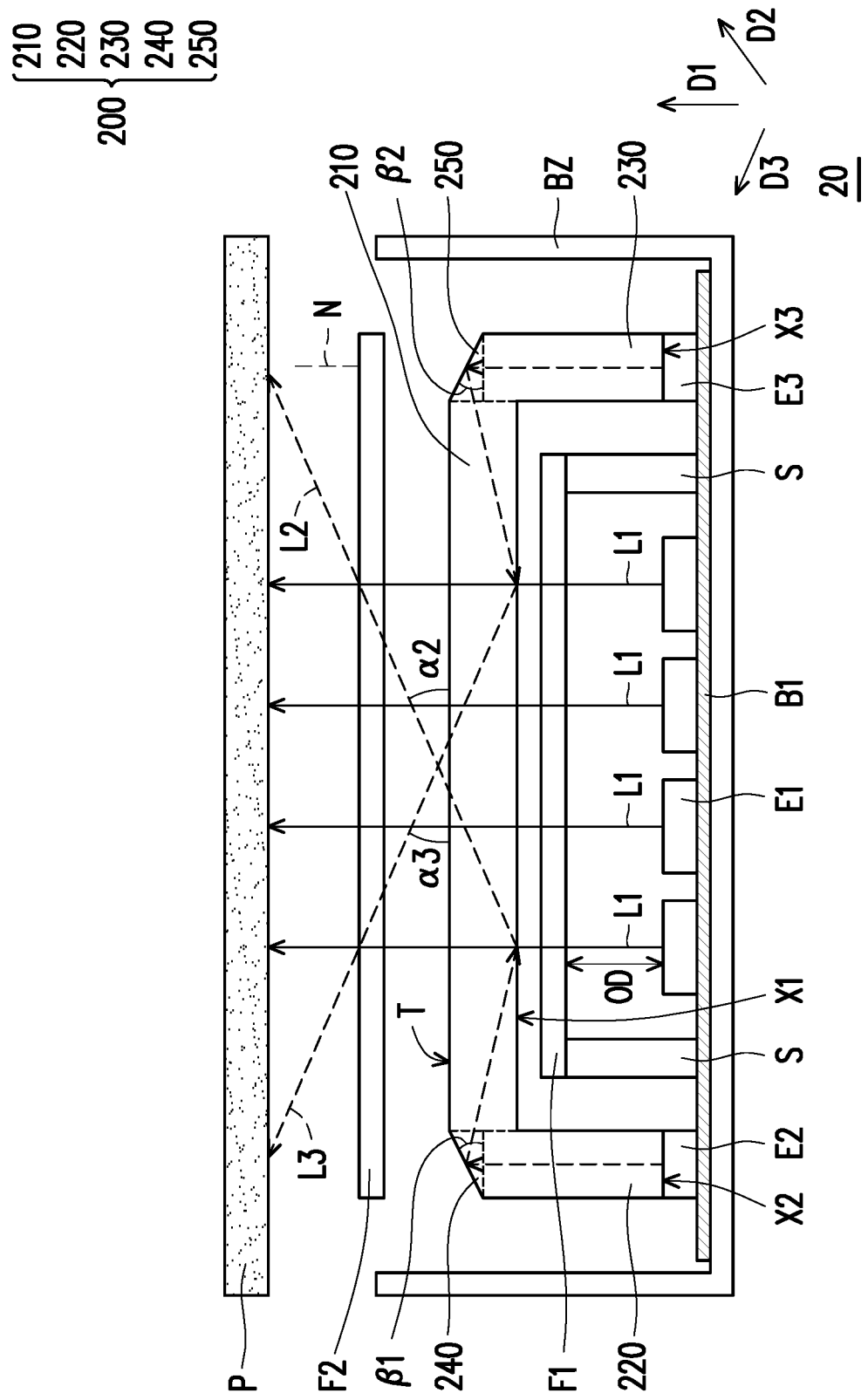
FIG. 2A is a schematic cross-sectional view illustrating a display device according to an embodiment of the invention.
Figure 2B:
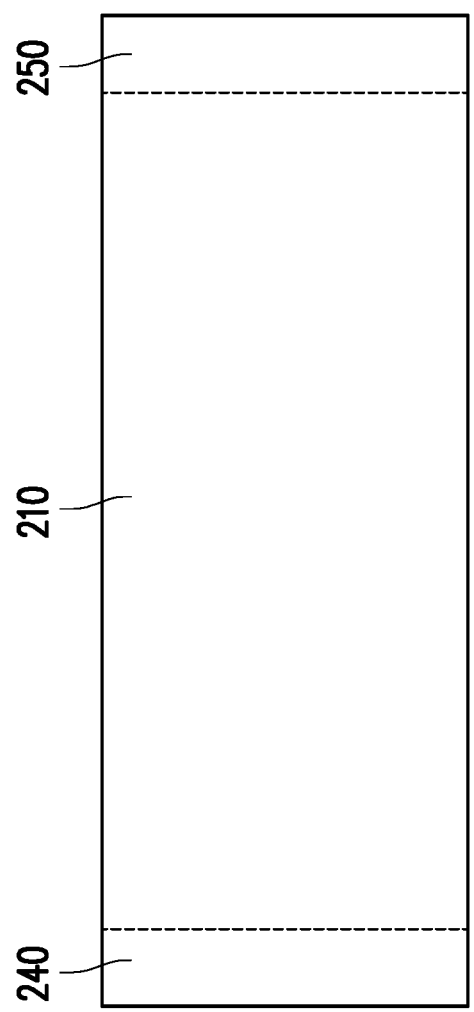
FIG. 2B is a schematic top view illustrating a light-guide device of FIG. 2A.

Referring to FIGS. 2A and 2B, FIG. 2A is a schematic cross-sectional view illustrating a display device according to an embodiment of the invention, and FIG. 2B is a schematic top view illustrating a light-guide device of FIG. 2A. The reference symbols and some contents of the embodiment shown in FIG. 1 are also used in the embodiment of FIGS. 2A and 2B, and like or similar reference symbols serve to represent like or similar components. Meanwhile, the descriptions of identical technical contents are omitted in the following. Detailed descriptions of the omitted part may be referred to the foregoing embodiment and thus will not be reiterated in the following.

In the embodiment, a light-guide device 200 includes a first light-guide plate 210, a second light-guide plate 220, a third light-guide plate 230, a light deflecting structure 240, and a light deflecting structure 250. The first light source E1, the second light source E2, and a third light source E3 are disposed on the circuit board B1.

The first light-guide plate 210 is located between the first light source E1 and the liquid crystal panel P, and the first light-receiving surface X1 is located at the first light-guide plate 210 and faces toward the first light source X1.

The second light-guide plate 220 is disposed at a side of the first light-guide plate 210, such as being disposed near a left end of the first light-guide plate 210. The second light-guide plate 220 has a bottom end and a top end. In addition, the top end of the second light-guide plate 220 is closer to the first light-guide plate 210 than the bottom end of the second light-guide plate 220. In addition, the second light-receiving surface X2 is located at the bottom end of the second light-guide plate 220. The second light-receiving surface X2 faces toward the second light source E2.

The light deflecting structure 240 is disposed at a side of the first light-guide plate 210 corresponding to the second light-guide plate 220. The second light beam L2 emitted by the second light source E2 may travel through the second light-guide plate 220, be deflected by the light deflecting structure 240, be guided toward the first light-guide plate 210, and then be emitted out of the light-emitting surface T of the first light-guide plate 210, for example. An included angle β1 is provided between a surface of the light deflecting structure 240 facing toward an outer side and a top surface of the second light-guide plate 220 or the light-emitting surface T of the first light-guide plate 210. The included angle β is greater than 0 degrees and less than 90 degrees, such as 45 degrees.

The third light-guide plate 230 is disposed at a side of the first light-guide plate 210. The third light-guide plate 230 and the second light-guide plate 220 are respectively disposed at different sides of the first light-guide plate 210. The third light-guide plate 230 is disposed near a right end of the first light-guide plate 210, for example. The third light-guide plate 230 has a bottom end and a top end. In addition, the top end of the third light-guide plate 230 is closer to the first light-guide plate 210 than the bottom end of the third light-guide plate 230. In addition, a third light-receiving surface X3 is at the bottom end of the third light-guide plate 230. The third light source E3 is disposed on the circuit board B1 in correspondence with the third light-guide plate 230. The third light-receiving surface X3 faces toward the third light source E3.

The light deflecting structure 250 is disposed at a side of the first light-guide plate 210 corresponding to the third light-guide plate 230. A third light beam L3 emitted by the third light source E3 may travel through the third light-guide plate 230, be deflected by the light deflecting structure 250, be guided toward the first light-guide plate 210, and then be emitted out of the light-emitting surface T of the first light-guide plate 210, for example. An included angle β2 is provided between a surface of the light deflecting structure 250 facing toward an outer side and a top surface of the third light-guide plate 230. The included angle β2 is greater than 0 degrees and less than 90 degrees, such as 45 degrees.

The included angle between the first average light-emitting direction D1 of the first light beam L1 leaving the light-emitting surface T and the light-emitting surface T is the first included angle α1. An included angle between a third average light-emitting direction D3 of the third light beam L3 leaving the light-emitting surface T and the light-emitting surface T is a third included angle α3. The included angle α1 between the first average light-emitting direction D1 and the light-emitting surface T is greater than the included angle α3 between the third average light-emitting direction D3 and the light-emitting surface T. The included angle α3 may be the same as or different from the included angle α2.

Since the first average light-emitting direction D1 is different from the third light-emitting direction D3, a viewing angle of the display device 20 may be adjusted by choosing to turn on the first light source E1 or turn on the second light source E2 and/or the third light source E3. For example, when the first light source E1 is turned on and the second light source E2 and the third light source E3 are turned off, the viewing angle of the display device 20 is a front viewing angle (about 0 degrees). If the third light source E3 is turned on and the first light source E1 is turned off, the viewing angle of the display device 10 may be deviated from the front and toward the side view angle. In the embodiment, the third average light-emitting direction D3 and the second average light-emitting direction D2 are different directions. Therefore, by turning on/off the first light source E1, the second light source E2, and the third light source E3, various viewing angles of the display device 20 are controlled. In some embodiments, the first light source E1, the second light source E2, and the third light source E3 may be turned on at the same time to increase the brightness of a frame displayed by the display device 20. Nevertheless, in another embodiment, the third average light-emitting direction D3 and the second average light-emitting direction D2 may be the same to enhance side light emission of a single viewing direction.

In the embodiment, the first light-guide plate 210, the second light-guide plate 220, the third light-guide plate 230, the light deflecting structure 240, and the light deflecting structure 250 are integrally formed. However, the invention is not limited thereto. In some embodiments, the light deflecting structure 240 and the first light-guide plate 210 or the light deflecting structure 240 and the second light-guide plate 220 may be adhered by an optical adhesive. In some embodiments, the light deflecting structure 250 and the first light-guide plate 210 or the light deflecting structure 250 and the third light-guide plate 230 may be adhered by an optical adhesive.

Figure 3A:
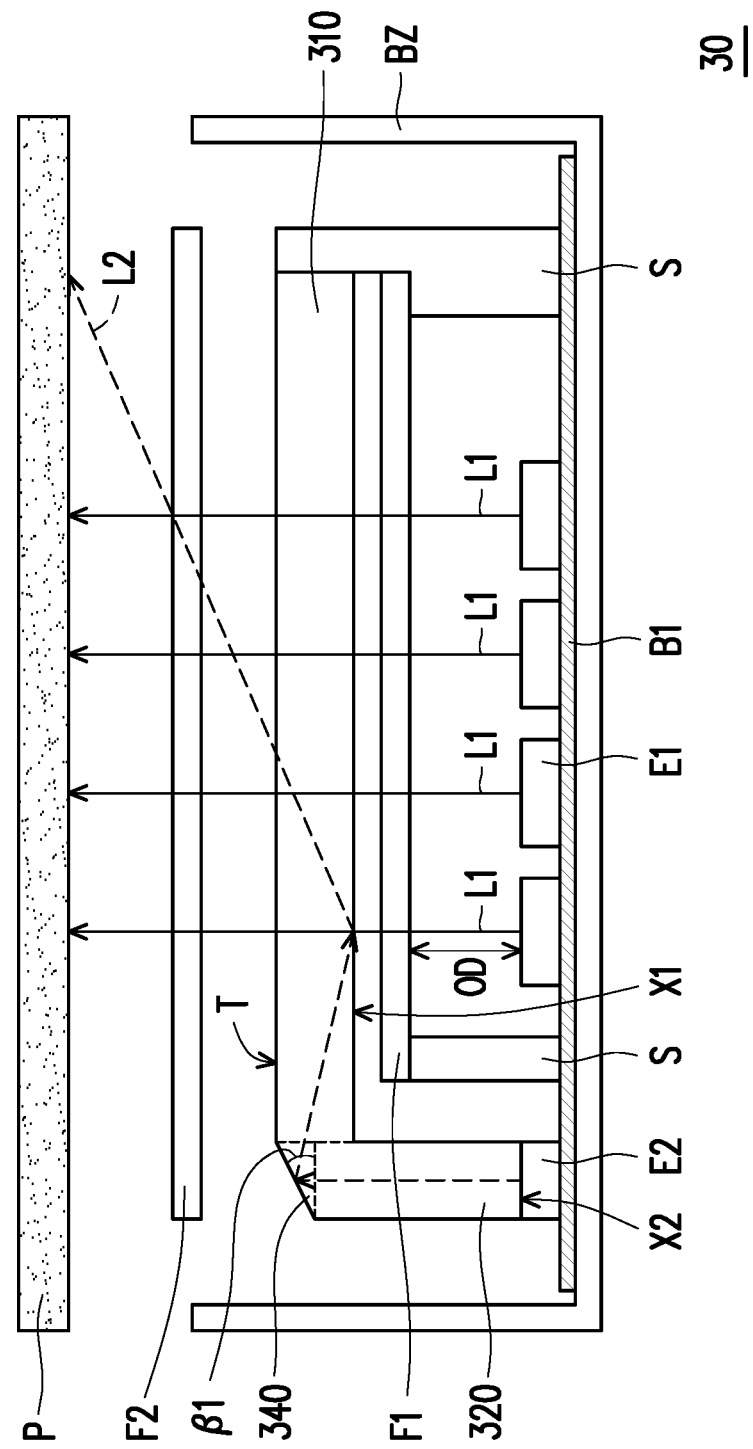
FIG. 3A is a schematic cross-sectional view illustrating a display device according to an embodiment of the invention.
Figure 3B:
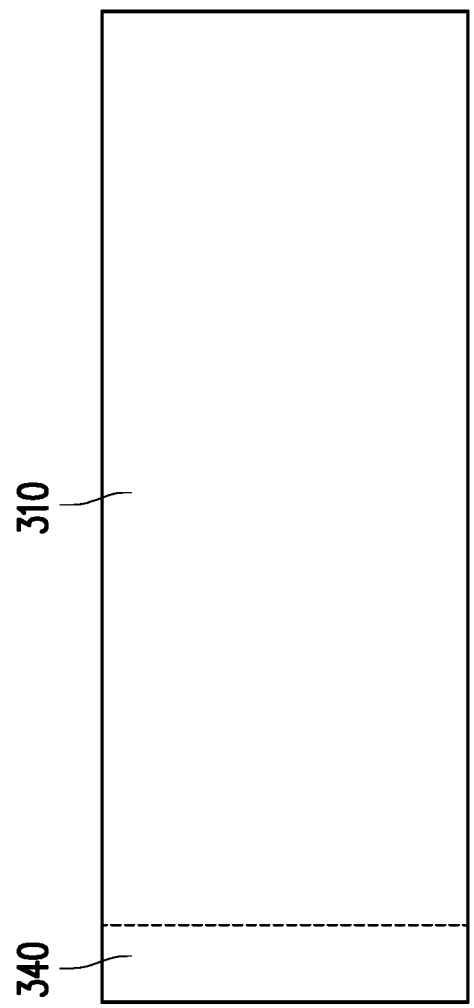
FIG. 3B is a schematic top view illustrating a light-guide device of FIG. 3A.

Referring to FIGS. 3A and 3B, FIG. 3A is a schematic cross-sectional view illustrating a display device according to an embodiment of the invention, and FIG. 3B is a schematic top view illustrating a light-guide device of FIG. 3A. The reference symbols and some contents of the embodiment shown in FIGS. 2A and 2B are also used in the embodiment of FIGS. 3A and 3B, and like or similar reference symbols serve to represent like or similar components. Meanwhile, the descriptions of identical technical contents are omitted in the following. Detailed descriptions of the omitted part may be referred to the foregoing embodiment and thus will not be reiterated in the following.

Referring to FIGS. 3A and 3B, a light-guide device 300 of a display device 30 includes a first light-guide plate 310, a light deflecting structure 340, and a second light-guide plate 320 connected in sequence, and the light-guide device 300 is substantially in an L shape. What differs from the previous embodiment is that the embodiment does not include the third light-guide plate 230 and the light deflecting structure 250. Therefore, the light-guide device 300 exhibits a cross-sectional shape substantially in an L shape.

Figure 4A:
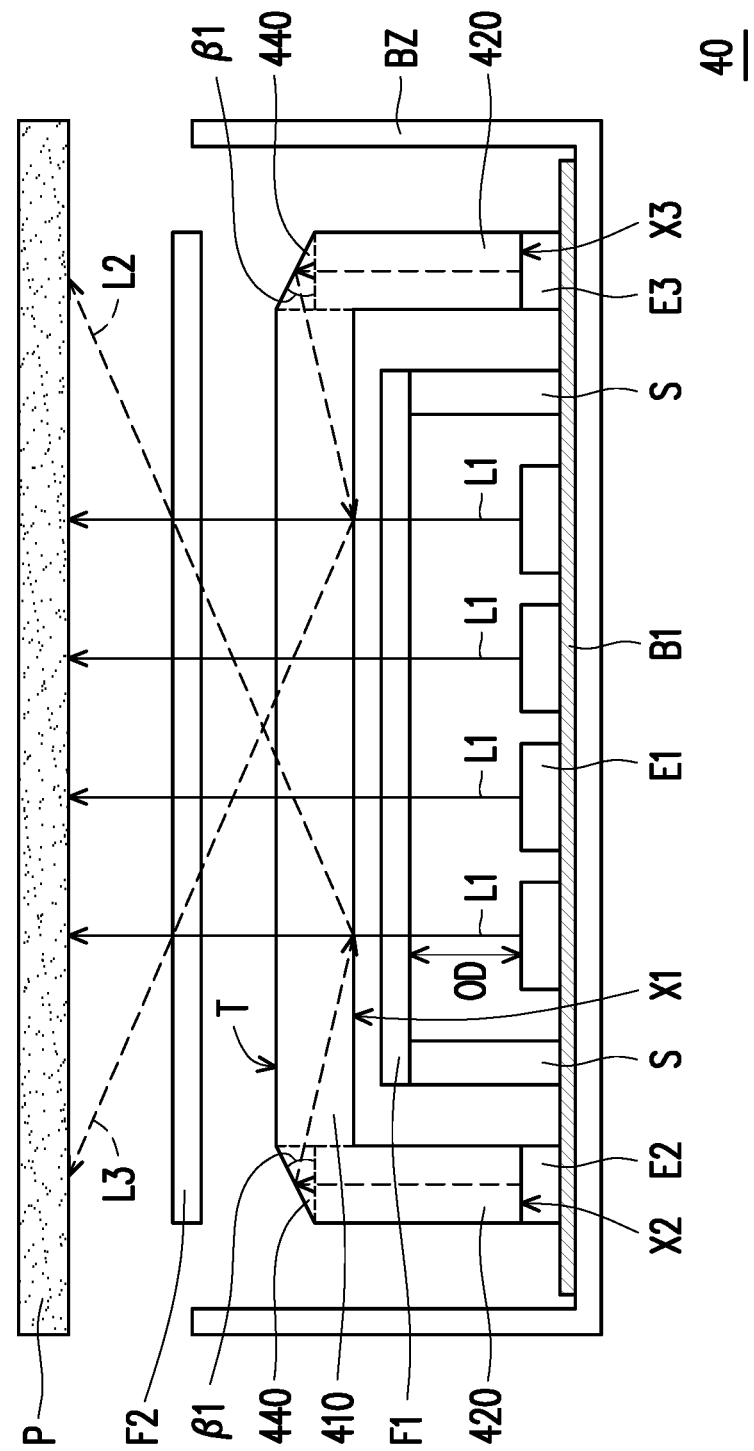
FIG. 4A is a schematic cross-sectional view illustrating a display device according to an embodiment of the invention.
Figure 4B:
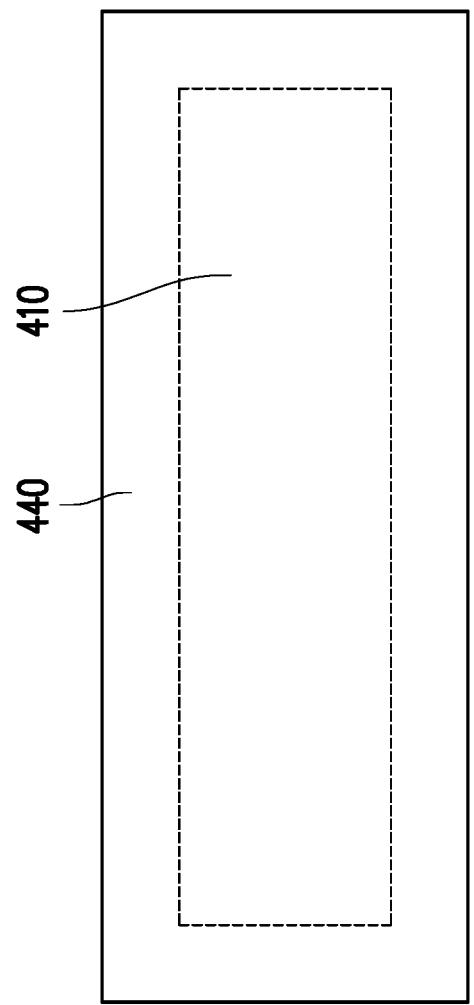
FIG. 4B is a schematic top view illustrating a light-guide device of FIG. 4A.

Referring to FIGS. 4A and 4B, FIG. 4A is a schematic cross-sectional view illustrating a display device according to an embodiment of the invention, and FIG. 4B is a schematic top view illustrating a light-guide device of FIG. 4A. The reference symbols and some contents of the embodiment shown in FIGS. 2A and 2B are also used in the embodiment of FIGS. 4A and 4B, and like or similar reference symbols serve to represent like or similar components. Meanwhile, the descriptions of identical technical contents are omitted in the following. Detailed descriptions of the omitted part may be referred to the foregoing embodiment and thus will not be reiterated in the following.

Referring to FIGS. 4A and 4B, a light-guide device 400 of a display device 40 includes a first light-guide plate 410, a light deflecting structure 440, and a second light-guide plate 420 connected in sequence.

The second light-guide plate 420 is perpendicular to the first light-guide plate 410 and the circuit board B1. The light deflecting structure 440 and the second light-guide plate 420 are arranged along a periphery of the first light-guide plate 410 to surround the first light-guide plate 410, as shown in FIG. 4B. A normal projection of the second light-guide plate 420 on the circuit board B1 surrounds a normal projection of the first light source E1 on the circuit board B1. In the embodiment, since the second light-guide plate 420 is substantially in an annular shape, a plurality of light sources, such as the second light source E2 and the third light source E3, may be disposed with respect to the light-receiving surfaces. The third light-receiving surface X3 of the second light-guide plate 420 may face toward the third light source E3, and the third light-receiving surface X3 and the second light-receiving surface X2 may be located at the same or different horizontal surfaces.

Figure 5:
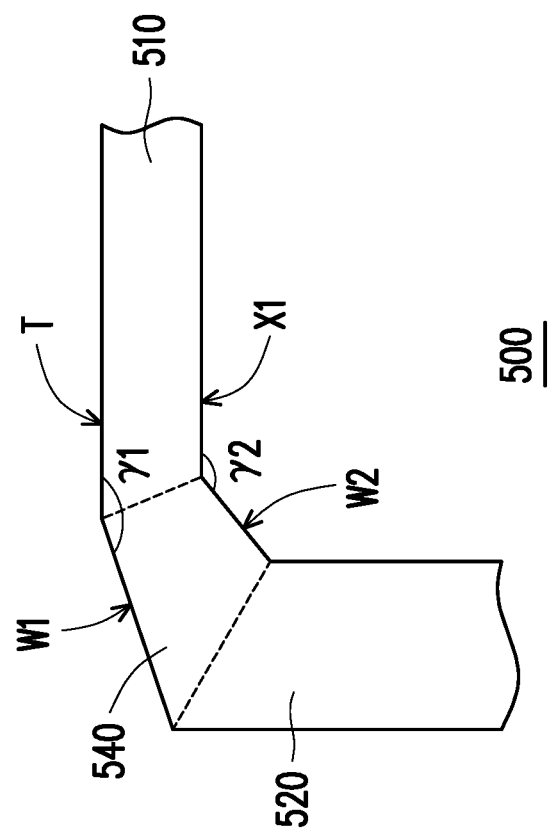
FIG. 5 is a partial schematic cross-sectional view illustrating a light-guide device according to an embodiment of the invention.

FIG. 5 is a partial schematic cross-sectional view illustrating a light-guide device according to an embodiment of the invention. The reference numerals and some contents in the previous embodiment are used in the embodiment of FIG. 5, in which like or similar reference numerals indicate like or similar components, and repeated description of the same technical contents is omitted. Detailed descriptions of the omitted part may be referred to the foregoing embodiment and thus will not be reiterated in the following.

In the embodiment, a light-guide device 500 includes a first light-guide plate 510, a light deflecting structure 540, and a second light-guide plate 520.

In the embodiment, a side surface W1 of the light deflecting structure 540 facing toward an outer side and a side surface W2 of the light deflecting structure 540 facing toward an inner side have different included angles with respect to the first light-guide plate 510. For example, an included angle $\gamma 1$ between the side surface W1 and the light-emitting surface T is greater than an included angle $\gamma 2$ between the side surface W2 and the first light-receiving surface X1. By controlling the included angles $\gamma 1$ and $\gamma 2$, the traveling direction of the second light beam L2 is controlled.

Figure 6:
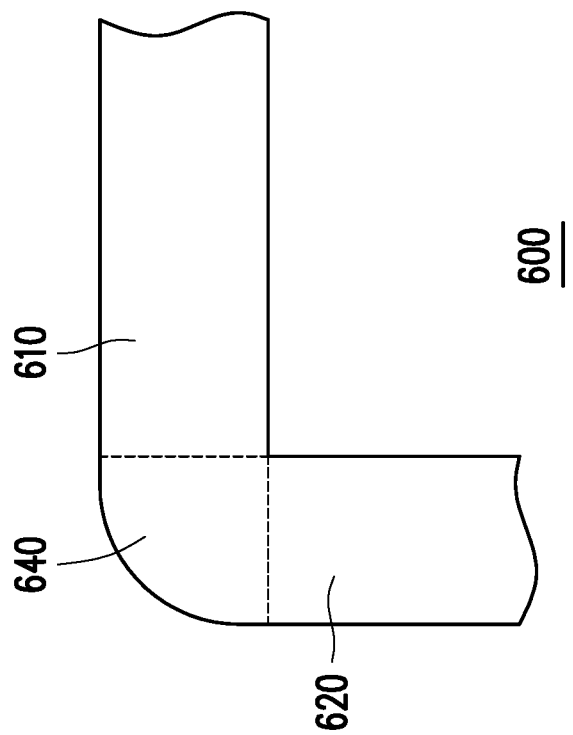
FIG. 6 is a partial schematic cross-sectional view illustrating a light-guide device according to an embodiment of the invention.

FIG. 6 is a partial schematic cross-sectional view illustrating a light-guide device according to an embodiment of the invention. In the embodiment, a light-guide device 600 includes a first light-guide plate 610, a light deflecting structure 640, and a second light-guide plate 620.

In the embodiment, a side surface of the light deflecting structure 640 facing toward an outer side is a curved convex surface. By adjusting the curvedness of the convex surface of the light deflecting structure 640, the traveling direction of the second light beam L2 is controlled.

While the embodiment illustrates that the side surface of the light deflecting structure 640 facing toward the outer side is a smooth curved convex surface, the invention is not limited thereto. In other embodiments, the side surface of the light deflecting structure 640 facing toward the outer side may be in an irregular shape, such as a spline shape, or other shapes.

Figure 7:
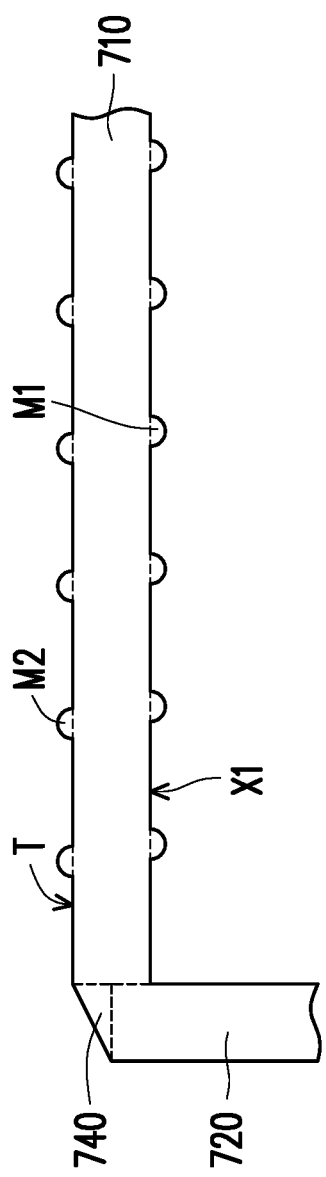
FIG. 7 is a partial schematic cross-sectional view illustrating a light-guide device according to an embodiment of the invention.

FIG. 7 is a partial schematic cross-sectional view illustrating a light-guide device according to an embodiment of the invention. The reference numerals and some contents in the previous embodiment are used in the embodiment of FIG. 7, in which like or similar reference numerals indicate like or similar components, and repeated description of the same technical contents is omitted. Detailed descriptions of the omitted part may be referred to the foregoing embodiment and thus will not be reiterated in the following.

In the embodiment, a light-guide device 700 includes a first light-guide plate 710, a light deflecting structure 740, and a second light-guide plate 720 connected in sequence. The light-guide device 700 optionally includes a plurality of first microstructures M1 protruding from the first light-receiving surface X1. The first microstructures M1 are protruding dots, for example. However, the invention is not limited thereto. The first microstructures M1 may also be in a shape of semi-circles, triangles, triangular prisms, trapezoids, or other geometric shapes. In the embodiment, the light-guide device 700 may optionally include a plurality of microstructures M2 protruding from the light-emitting surface T. The second microstructures M2 are protruding dots, for example. However, the invention is not limited thereto. The second microstructures M2 may also be in a shape of semi-circles, triangles, triangular prisms, trapezoids, or other geometric shapes.

The first microstructures M1 and the second microstructures M2 are able to facilitate the light emitting efficiency of the light-guide device 700. Even though other embodiments do not illustrate the first microstructures M1 and the second microstructures M2, the first microstructures M1 and the second microstructures M2 may also be applied in the light-guide device of any other embodiments of the invention.

Figure 8:
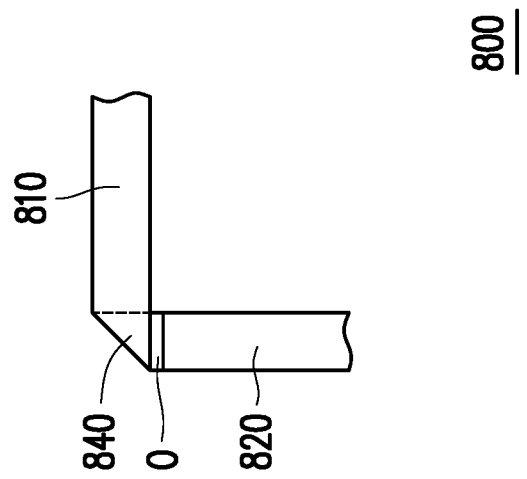
FIG. 8 is a partial schematic cross-sectional view illustrating a light-guide device according to an embodiment of the invention.

FIG. 8 is a partial schematic cross-sectional view illustrating a light-guide device according to an embodiment of the invention. In the embodiment, a light-guide device 800 includes a first light-guide plate 810, a light deflecting structure 840, an optical adhesive O, and a second light-guide plate 820 connected in sequence.

In the embodiment, the light deflecting structure 840 and the first light-guide plate 810 may be integrally formed. The light deflecting structure 840 is adhered to the second light-guide plate 820 through the optical adhesive O. In addition, the optical adhesive O may include a transparent material, for example. Accordingly, the manufacturing complexity of the light-guide device 800 of the embodiment may be reduced.

Figure 9:
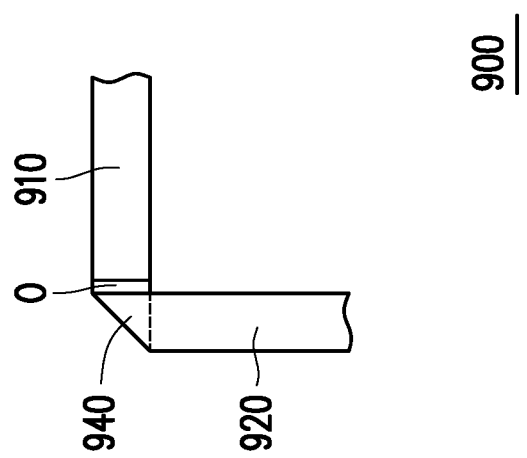
FIG. 9 is a partial schematic cross-sectional view illustrating a light-guide device according to an embodiment of the invention.

FIG. 9 is a partial schematic cross-sectional view illustrating a light-guide device according to an embodiment of the invention. In the embodiment, a light-guide device 900 includes a first light-guide plate 910, the optical adhesive O, a light deflecting structure 940, and a second light-guide plate 920 connected in sequence.

In the embodiment, the light deflecting structure 940 and the second light-guide plate 920 may be integrally formed. The light deflecting structure 940 is adhered to the first light-guide plate 910 through the optical adhesive O. Accordingly, the manufacturing complexity of the light-guide device 900 of the embodiment may be reduced.

Figure 10:
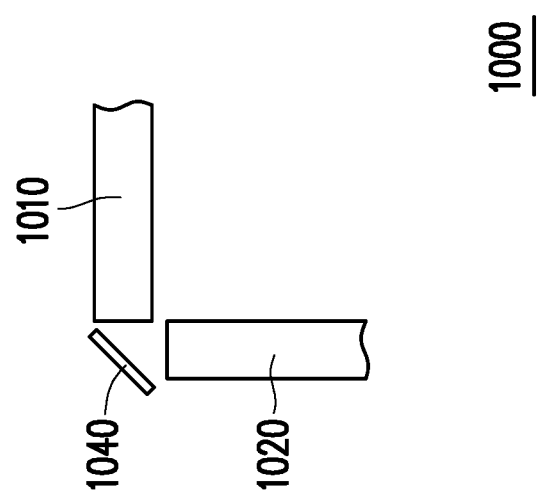
FIG. 10 is a partial schematic cross-sectional view illustrating a light-guide device according to an embodiment of the invention.

FIG. 10 is a partial schematic cross-sectional view illustrating a light-guide device according to an embodiment of the invention. In the embodiment, a light-guide device 1000 includes a first light-guide plate 1010, a light deflecting structure 1040, and a second light-guide plate 1020.

In the embodiment, the first light-guide plate 1010 and the second light-guide plate 1020 are separated. The light deflecting structure 1040 is a diffraction grating or a reflective layer, for example. Even though there is no other components disposed between the first light-guide plate 1010 and the light deflecting structure 1040 and between the second light-guide plate 1020 and the light deflecting structure 1040, the invention is not limited thereto. In some embodiment, the light deflecting structure of other embodiments may also be disposed between the first light-guide plate 1010 and the light deflecting structure 1040 or between the second light-guide plate 1020 and the light deflecting structure 1040. In other words, the light deflecting structure 1040 of the embodiment may be used with the light deflecting structure of other embodiments.

In view of the foregoing, according to the embodiments of the invention, the viewing angle of the display device is adjustable by choosing to turn on the first light source or turning on the second light source. For example, when the first light source is turned on and the second light source is turned off, the viewing angle of the display device is about 0 degrees. If the second light source is turned on and the first light source is turned off, the viewing angle of the display device is deviated from 0 degrees. In other words, the viewing angle of the display device may be controlled through the first light source and the second light source.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:
   a first light source and a second light source;
   a display panel, disposed on the first light source and the second light source; and
   a light-guide device, located between the first light source and the liquid crystal panel, wherein a first light-receiving surface of the light-guide device faces toward the first light source, a second light-receiving surface of the light-guide device faces toward the second light source, and the first light-receiving surface is different from the second light-receiving surface, wherein
   a first light beam emitted by the first light source enters the light-guide device through the first light-receiving surface and leaves the light-guide device through a light-emitting surface opposite to the first light-receiving surface,
   a second light beam emitted by the second light source enters the light-guide device through the second light-receiving surface and leaves the light-guide device through the light-emitting surface, and
   wherein an included angle between a first average light-emitting direction of the first light beam leaving the light-emitting surface and the light-emitting surface is a first included angle, an included angle between a second average light-emitting direction of the second light beam leaving the light-emitting surface and the light-emitting surface is a second included angle, and the first included angle is greater than the second included angle.

2. The display device as claimed in claim 1, wherein the second light-receiving surface is connected with the first light-receiving surface and the light-emitting surface.

3. The display device as claimed in claim 1, wherein the light-guide device comprises:
   a first light-guide plate, located between the first light source and the liquid crystal panel, wherein the first light-receiving surface is located at the first light-guide plate; and
   a second light-guide plate, disposed at a side of the first light-guide plate and having a bottom end and a top end, wherein the top end is closer to the first light-guide plate than the bottom end, and the second light-receiving surface is located at the bottom end.

4. The display device as claimed in claim 3, further comprising:
   a circuit board, wherein the first light source and the second light source are disposed on the circuit board.

5. The display device as claimed in claim 4, further comprising:
   a third light-guide plate, disposed at another side of the first light-guide plate; and
   a third light source, disposed on the circuit board in correspondence with the third light-guide plate.

6. The display device as claimed in claim 3, wherein the second light-guide plate is perpendicular to the first light-guide plate, and the second light-guide plate is disposed to surround a periphery of the first light-guide plate.

7. The display device as claimed in claim 3, wherein the light-guide device further comprises a light deflecting structure disposed to the side of the first light-guide plate corresponding to the second light-guide plate.

8. The display device as claimed in claim 7, wherein the light deflecting structure and the first light-guide plate are integrally formed.

9. The display device as claimed in claim 7, wherein the light deflecting structure and the second light-guide plate are integrally formed.

10. The display device as claimed in claim 7, wherein the first light-guide plate, the light deflecting structure and the second light-guide plate are integrally formed.

11. The display device as claimed in claim 7, wherein the light deflecting structure is adhered to the second light-guide plate or the first light-guide plate.

12. The display device as claimed in claim 1, further comprising a first optical film disposed between the light-guide device and the first light source.

13. The display device as claimed in claim 12, wherein the first optical film comprises a diffuser film.

14. The display device as claimed in claim 12, further comprising a second optical film disposed between the light-guide device and the liquid crystal panel.

15. The display device as claimed in claim 1, wherein the light-guide device comprises a plurality of first microstructures protruding from the first light-receiving surface.

16. The display device as claimed in claim 1, wherein the light-guide device comprises a plurality of second microstructures protruding from the light-emitting surface.

* * * * *